United States Patent
Hongo

(10) Patent No.: US 11,585,725 B2
(45) Date of Patent: Feb. 21, 2023

(54) FEED AXIS DIAGNOSTIC DEVICE AND DIAGNOSTIC METHOD FOR MACHINE TOOL

(71) Applicant: OKUMA CORPORATION, Niwa-Gun (JP)

(72) Inventor: Takumi Hongo, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 80 days.

(21) Appl. No.: 17/098,769

(22) Filed: Nov. 16, 2020

(65) Prior Publication Data

US 2021/0190632 A1 Jun. 24, 2021

(30) Foreign Application Priority Data

Dec. 18, 2019 (JP) .............................. JP2019-228491

(51) Int. Cl.
*G01M 13/02* (2019.01)
(52) U.S. Cl.
CPC ................................. *G01M 13/02* (2013.01)
(58) Field of Classification Search
CPC ................................................... G01M 13/02
See application file for complete search history.

(56) References Cited

U.S. PATENT DOCUMENTS

| 2018/0218255 A1* | 8/2018 | Ueno ....................... G06N 3/08 |
| 2019/0003924 A1* | 1/2019 | Hongo ................ G01M 13/028 |
| 2019/0163164 A1* | 5/2019 | Hongo ................... G05B 19/19 |
| 2019/0361758 A1 | 11/2019 | Yamanaka et al. |
| 2021/0101241 A1* | 4/2021 | Hongo ............... G05B 19/4062 |
| 2021/0140853 A1* | 5/2021 | Ito ....................... G01M 99/005 |

FOREIGN PATENT DOCUMENTS

| JP | 2005-042785 A1 | 2/2005 |
| JP | 2012-193803 A1 | 10/2012 |
| JP | 2018-138817 A1 | 9/2018 |

* cited by examiner

*Primary Examiner* — Eric S. McCall
(74) *Attorney, Agent, or Firm* — Burr Patent Law, PLLC

(57) ABSTRACT

A feed axis diagnostic device for a machine tool is provided. The machine tool machines a workpiece while driving a moving body with feed axes along a guide surface of a rolling guide mechanism. The feed axis diagnostic device includes a feed axis diagnostic unit configured to detect an abnormality in the rolling guide mechanism in the machine tool. The feed axis diagnostic unit is configured to acquire a feed speed during non-machining and a load applied to the feed axes at the feed speed. The abnormality is detected based on an approximate function calculated from relationships between a plurality of the feed speeds and a plurality of the loads acquired under a plurality of different feed speed conditions in a predetermined period.

5 Claims, 3 Drawing Sheets

FEED AXIS DIAGNOSTIC DEVICE AND DIAGNOSTIC METHOD FOR MACHINE TOOL

BACKGROUND OF THE INVENTION

This application claims the benefit of Japanese Patent Application Number 2019-228491 filed on Dec. 18, 2019, the entirety of which is incorporated by reference.

TECHNICAL FIELD OF THE INVENTION

The disclosure relates to a feed axis diagnostic device and a feed axis diagnostic method for a machine tool that has feed axes to drive a moving body along a rolling guide mechanism.

DESCRIPTION OF RELATED ART

For recent feed axes of a machine tool, a configuration in which a rotational motion of a motor is transmitted to a ball screw to drive a moving body and the moving body is movable along a rolling guide mechanism has been widely employed. However, when aged deterioration, contamination with foreign matter, poor lubrication, or the like occurs in a driving part, such as the ball screw and the rolling guide mechanism, the feed axes do not normally operate, and a processing defect, such as a poor shape of a machined object and a poor machined surface property, occurs, adversely affecting its production. Therefore, to achieve the stable production in the operation of the machine tool, it has been desired to detect an abnormality in a machine and notify a manager and a worker of the state of the machine to avoid the processing defect of a workpiece in advance, and methods that perform various diagnoses have been proposed.

For example, one of the feed axis abnormalities in the machine tool is a damage to an end plate of a moving block in the rolling guide mechanism. In the rolling guide mechanism, when a rolling element circulates inside of the moving block while rolling on a track member, a direction change path is formed in the end plate of the moving block to invert its transfer direction. Here, when the circulation state gets worse due to contamination with foreign matter or the like, there may be a case where an excessive load is applied to the end plate, the end plate is damaged, and the rolling element drops off outside the moving block. When the rolling element drops off, the moving block fails to achieve its guiding function, and therefore a posture of the moving body changes, causing a failure, such as deterioration of positioning performance.

As a device that detects the damage in the end plate of the moving block in the rolling guide mechanism as described above, Japanese Unexamined Patent Application Publication No. 2005-42785 and Japanese Unexamined Patent Application Publication No. 2012-193803 disclose the following method. A sensor that detects a deformation of the end plate in a rolling guide device is disposed on the moving block to predict or detect damage in the end plate.

Additionally, Japanese Unexamined Patent Application Publication No. 2018-138817 discloses the following method. In the method, output signals different in data collection time from a sensor are taken in using a vibration sensor mounted to a track member of a rolling guide device and each analysis result is compared with threshold data to determine in which transfer surface of a moving block or the track member abnormity occurs.

However, to employ the above-described method for the machine tool, a large number of sensors for diagnosis are mounted. For example, a general machining center has three feed axes, and four moving blocks are used per axis. Accordingly, assuming that the sensors are mounted to both surfaces of the moving blocks, at least 24 sensors are used. In other words, in the above-described methods, cost of the sensors themselves and manufacturing cost caused by a wiring work to an information collection device are increased, and failure caused by a failure of the sensors themselves nay be increased. Moreover, a load and a vibration generated during machining of a workpiece, a weight change of the workpiece, and the like become disturbance to the sensor outputs, and therefore a special operation for diagnosis is needed separately from the usual operation.

Therefore, an object of the disclosure is to provide a feed axis diagnostic device and a feed axis diagnostic method for a machine tool that allow abnormality detection in a rolling guide mechanism considering influence by a weight change of a workpiece based on a control signal used for feed axes of a usual machine tool.

SUMMARY OF THE INVENTION

In order to achieve the above-described object, a feed axis diagnostic device for a machine tool according to a first aspect of the disclosure is provided. The machine tool machines a workpiece while driving a moving body with feed axes along a guide surface of a rolling guide mechanism. The feed axis diagnostic device includes a feed axis diagnostic unit configured to detect an abnormality in the rolling guide mechanism in the machine tool. The feed axis diagnostic unit is configured to acquire a feed speed during non-machining and a load applied to the feed axes at the feed speed. The abnormality is detected based on an approximate function calculated from relationships between a plurality of the feed speeds and a plurality of the loads acquired under a plurality of different feed speed conditions in a predetermined period.

In the disclosure according to a second aspect of the disclosure, which is in the first aspect of the disclosure, the feed axis diagnostic unit is configured to obtain the plurality of feed speeds and the plurality of loads when the feed axes become to have a constant speed during the non-machining.

In the disclosure according to a third aspect of the disclosure, which is in the first or second aspect of the disclosure, a linear approximation is performed in the approximate function. When a calculated coefficient is smaller than a preset threshold, a poor circulation occurring in the rolling guide mechanism is determined.

In the disclosure according to a fourth aspect of the disclosure, which is in the third aspect of the disclosure, the linear approximation is performed in the approximate function. When the calculated coefficient is smaller than the preset threshold and a calculated constant term is greater than a preset threshold, the poor circulation occurring in the rolling guide mechanism is determined.

The disclosure according to a fifth aspect is a feed axis diagnostic method for a machine tool that detects an abnormality in a rolling guide mechanism in a machine tool. The machine tool machines a workpiece while driving a moving body with feed axes along a guide surface of the rolling guide mechanism. The feed axis diagnostic method includes acquiring a feed speed during non-machining and a load applied to the feed axes at the feed speed. The feed axis diagnostic method also includes detecting the abnormality based on an approximate function calculated from relationships between a plurality of the feed speeds and a plurality of the loads acquired under a plurality of different feed speed conditions in a predetermined period.

With the disclosure according to the first, third, and fifth aspects, the abnormality detection of the rolling guide mechanism can be performed based on a control signal used for the feed axes in the usual machine tool without adding sensors for diagnosis.

With the disclosure according to the second aspect, the abnormality detection of the rolling guide mechanism can be performed with further high accuracy.

With the disclosure according to the fourth aspect, in addition to the above-described effects, the abnormality detection of the rolling guide mechanism can be performed considering influence of a weight change of the workpiece.

DETAILED DESCRIPTION OF THE INVENTION

The following describes embodiments of the disclosure based on the drawings.

Figure 1:
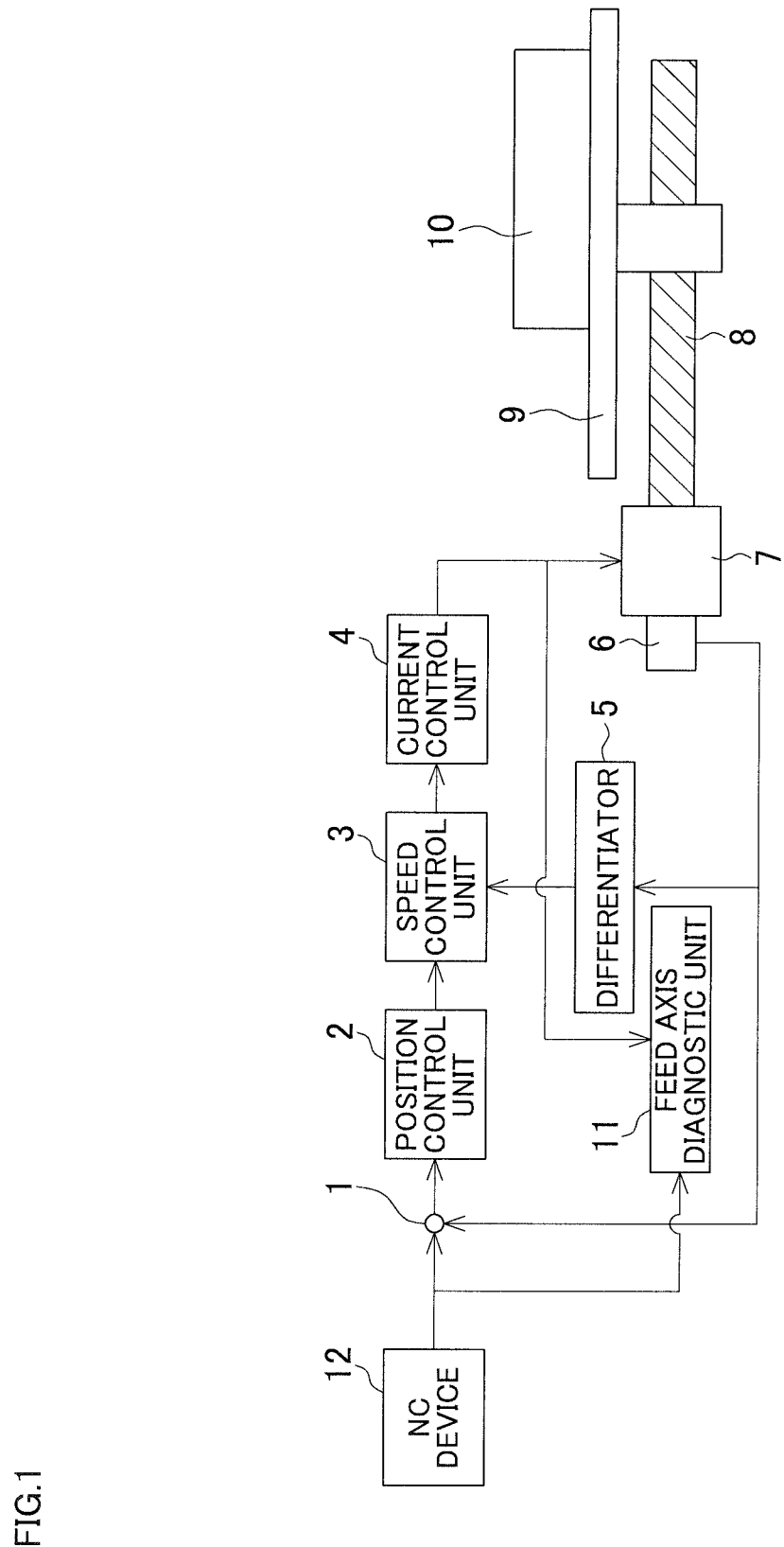
FIG. 1 is an explanatory view illustrating a diagnostic device of feed axes of the disclosure.

FIG. 1 is an explanatory view illustrating a diagnostic device of feed axes of the disclosure.

A machine tool includes a moving body 9 that is slidable by a ball screw 8 rotated by driving of a servomotor 7. The moving body 9 is configured to perform a linear motion along a guide surface of a rolling guide mechanism 10.

The servomotor 7 drives the moving body 9 via the ball screw 8 to move a workpiece (not illustrated) placed on the moving body 9 up to a predetermined position, thus the workpiece is machined.

A feed axis diagnostic device includes a position detector 6, an NC device 12, a subtractor 1, a position control unit 2, a differentiator 5, a speed control unit 3, and a current control unit 4. The position detector 6 is disposed on the servomotor 7 and detects a rotation position of the servomotor 7 to detect a position of the moving body 9. The NC device 12 outputs a position command value for the moving body 9. The subtractor 1 subtracts the position of the moving body 9 obtained by the position detector 6 from the position command value output from the NC device 12 and calculates a position deviation. The position control unit 2 outputs a speed command value based on the calculated position deviation. The differentiator 5 differentiates the output speed command value and a rotation signal obtained from the position detector 6 to obtain a rotation speed of the servomotor 7. The speed control unit 3 outputs a motor torque command value based on the obtained rotation speed of the servomotor 7. The current control unit 4 amplifies the motor torque command value and outputs it to the servomotor 7. The feed axis diagnostic device further includes a feed axis diagnostic unit 11 that performs abnormality detection of the rolling guide mechanism 10 based on the position command value from the NC device 12 and the motor torque command value output from the speed control unit 3.

The NC device 12 can record and display information on each command value or the like.

Next, a procedure for the diagnosis in the disclosure will be described.

Figure 2:
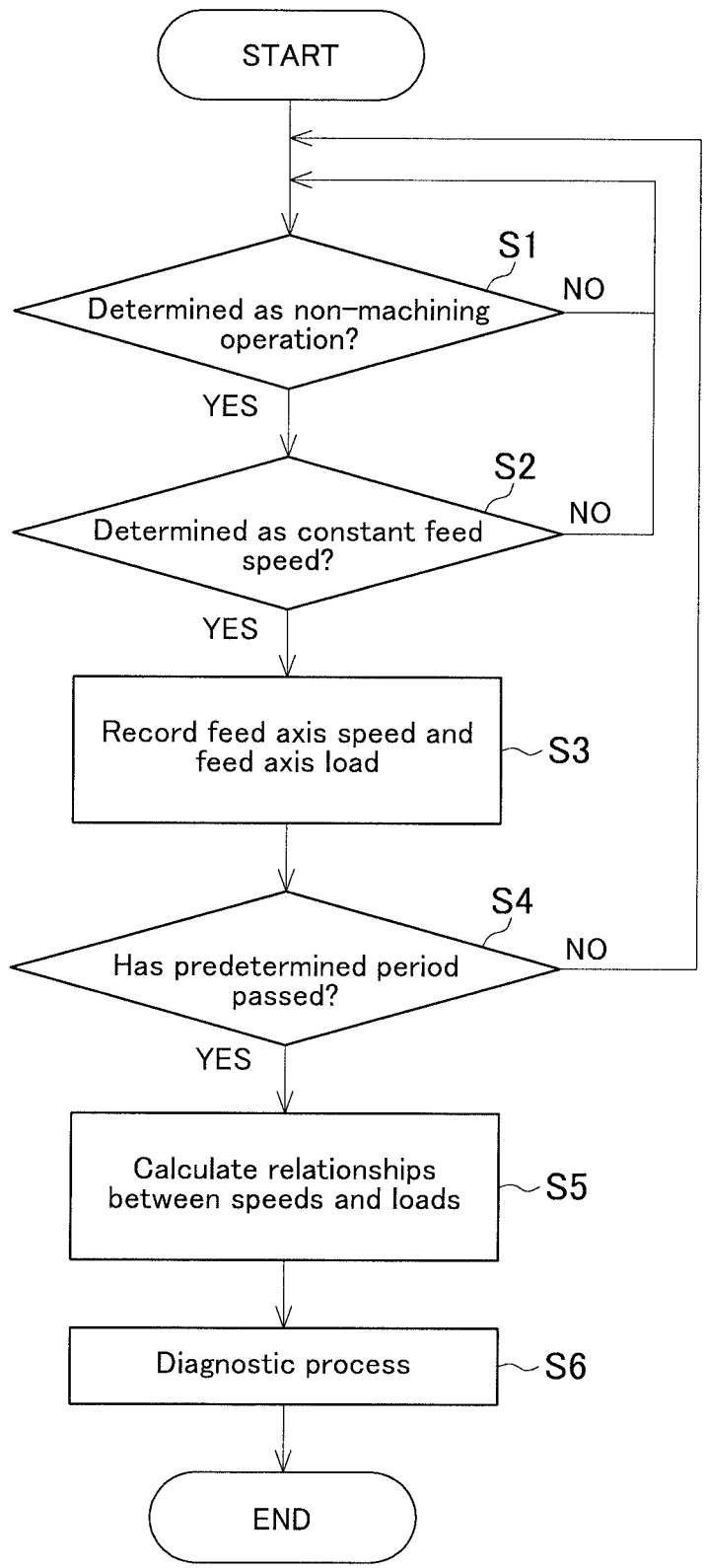
FIG. 2 is a flowchart depicting a procedure for feed axis diagnosis of the disclosure.

FIG. 2 is a flowchart depicting the procedure for the feed axis diagnosis of the disclosure.

First, it is determined whether it is during a non-machining operation or not (S1). Here, when a change in load applied to a main spindle not illustrated in FIG. 1 becomes equal to or less than a certain value from a load immediately after the main spindle has a constant rotation speed during a positioning operation command and during a cutting feed command, it is determined to be during the non-machining operation.

When it is determined to be during the non-machining operation, it is determined whether a feed speed of the moving body 9 has become a constant speed or not (S2).

When the feed speed of the moving body 9 has become the constant speed, a feed speed and a feed axis load in one operation are acquired (S3). At this time, the feed speed is acquired as a command speed. Additionally, the feed axis load is acquired as an average value of load information detected until a cancellation of the constant speed determination of the feed speed or a cancellation of the determination during non-machining operation.

The processes from S1 to S3 are repeatedly performed until a set predetermined period has passed, and the feed axis loads corresponding to the plurality of feed speeds are acquired (S4). Any given period, for example, one day and an operation of one program, is set as the predetermined period.

Figure 3:
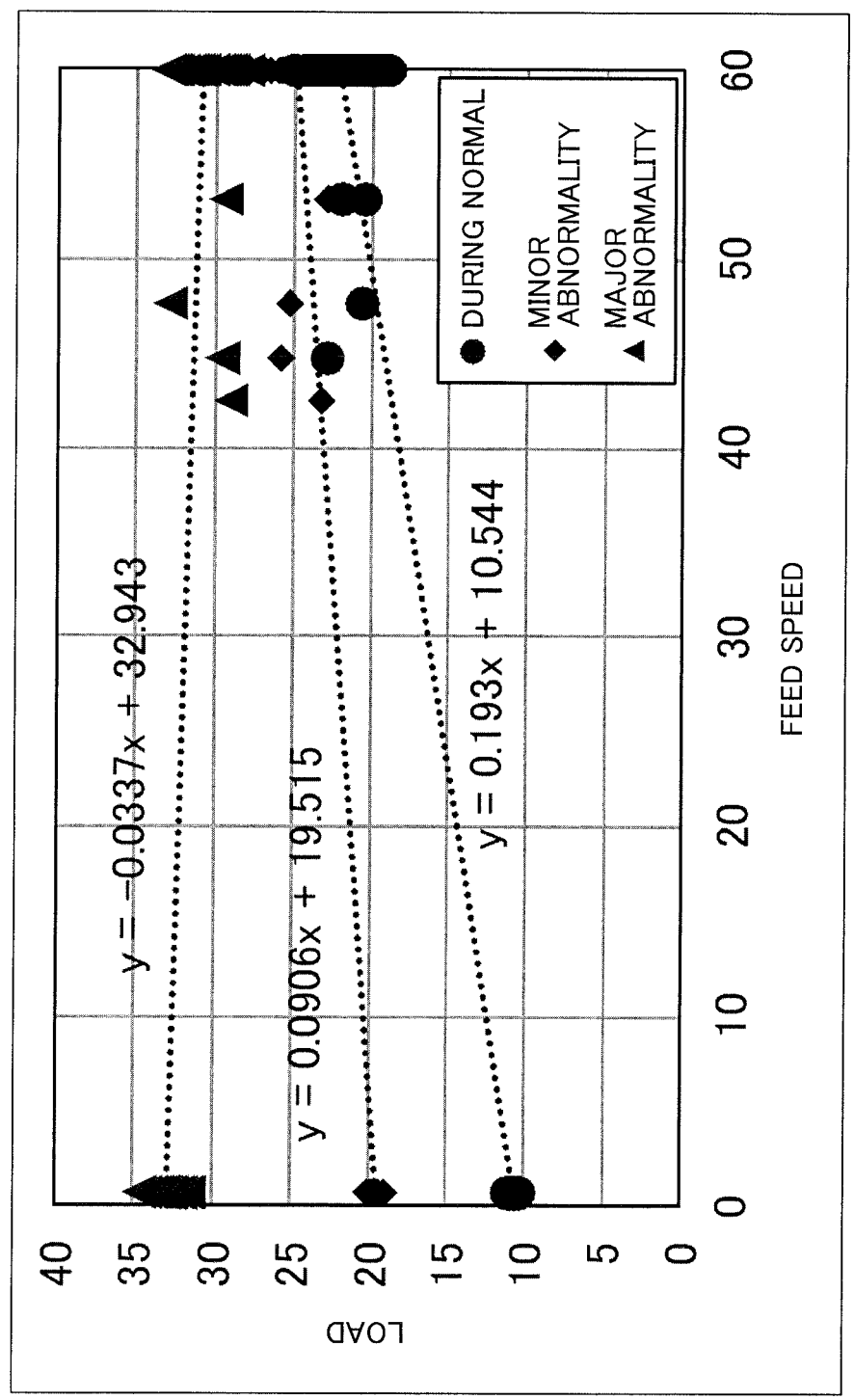
FIG. 3 is a graph showing examples of a relationship between extracted feed speeds and feed axis loads.

After the predetermined period has passed, relationships between the plurality of obtained feed speeds and the obtained feed axis loads are calculated (S5). Here, the relationships between the feed speeds and the feed axis loads are calculated by linear approximation. FIG. 3 shows examples of the relationship between the feed speeds and the feed axis loads.

At S5, presence of an abnormality in the rolling guide mechanism 10 is diagnosed based on a coefficient and a constant term of an approximation formula on which the linear approximation has been performed (S6). When poor circulation occurs in the rolling guide mechanism 10, the coefficient of the approximation formula becomes smaller and the constant term becomes larger than those during normal. A coefficient threshold and a constant term threshold are preliminarily set based on the approximation formulas calculated from the relationships between the feed speeds and the feed axis loads during normal. When the coefficient of the approximation formula becomes smaller than the coefficient threshold and the constant term becomes larger than the constant term threshold, it is determined that the poor circulation occurs in the rolling guide mechanism 10. Meanwhile, in a case where the rolling guide mechanism 10 normally functions, when weight of the moving body 9 applied to the ball screw 8 changes by the workpiece, a gradient of the approximation formula, namely, the coefficient does not change but the constant term changes alone. Therefore, the abnormality detection of the rolling guide mechanism 10 can be performed considering a weight change of the workpiece.

The feed axis diagnostic device of the above-describe d configuration includes the feed axis diagnostic unit 11 that detects an abnormality in the rolling guide mechanism 10 in the machine tool. The machine tool machines the workpiece while driving the moving body 9 with the ball screw 8 along the guide surface of the rolling guide mechanism 10. The feed axis diagnostic unit 11 acquires the feed speed during non-machining and the load applied to the ball screw 8 at the feed speed. The abnormality is detected based on an approximate function calculated from the relationships between a plurality of the feed speeds and a plurality of the loads acquired under a plurality of different feed speed conditions in a predetermined period.

With the feed axis diagnostic device thus configured, the abnormality detection of the rolling guide mechanism 10 can be performed based on a control signal used for the ball screw 8 in the usual machine tool without adding sensors for diagnosis.

The feed axis diagnostic unit 11 is configured to obtain the plurality of feed speeds and the plurality of loads when the ball screw 8 becomes to have the constant speed during non-machining. The abnormality is detected based on the approximate function calculated from the relationships between the plurality of feed speeds and the plurality of loads acquired under the plurality of different feed speed conditions in the predetermined period.

Accordingly, the abnormality detection of the rolling guide mechanism 10 can be performed with a further high accuracy.

The linear approximation is performed in the approximate function. When the calculated coefficient is smaller than a preset threshold and the calculated constant term is greater than a preset threshold, it is determined that a poor circulation occurs in the rolling guide mechanism.

Accordingly, the abnormality detection of the rolling guide mechanism 10 can be performed considering influence of the weight change of the workpiece.

The disclosure has been described above based on the examples in the drawings, and its technical scope is not limited to the examples.

For example, the abnormality of the rolling guide mechanism 10 may be determined as follows. Using the coefficient of the approximation formula alone, when the calculated coefficient is smaller than the preset threshold, it is determined that the poor circulation occurs in the rolling guide mechanism 10.

Additionally, the feed axis diagnostic device may be arranged outside the machine tool.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A feed axis diagnostic device for a machine tool machining a workpiece while driving a moving body defining a feed axis along a guide surface of a rolling guide mechanism, the feed axis diagnostic device comprising:
    a feed axis diagnostic unit configured to detect an abnormality in the rolling guide mechanism of the machine tool,
    wherein the feed axis diagnostic unit is configured to repeatedly acquire a plurality of feed speeds and a plurality of loads applied to the moving body in the feed axis at the acquired feed speeds in a non-machining state under a plurality of different feed speed conditions during a predetermined period, and
    wherein the abnormality is detected based on an approximate function calculated from relationships between the plurality of feed speeds and the plurality of loads acquired under the plurality of different feed speed conditions during the predetermined period.

2. The feed axis diagnostic device for the machine tool according to claim 1, wherein the feed axis diagnostic unit is configured to obtain the plurality of feed speeds and the plurality of loads when the feed axis of the moving body is determined to be at a constant speed during the non-machining.

3. The feed axis diagnostic device for the machine tool according to claim 1, wherein a linear approximation is performed in the approximate function, and when a calculated coefficient of the linear approximation is smaller than a preset threshold value, a poor rotation condition of the rolling guide mechanism is determined.

4. The feed axis diagnostic device for the machine tool according to claim 3, wherein the linear approximation is performed in the approximate function, and when the calculated coefficient of the linear approximation is smaller than the preset threshold value, and a calculated constant term is greater than a preset threshold value, the poor rotation condition of the rolling guide mechanism is determined.

5. A feed axis diagnostic method that detects an abnormality of a rolling guide mechanism in a machine tool, the method comprising:
    providing the machine tool having the rolling guide mechanism, wherein the machine tool machines a workpiece while driving a moving body defining a feed axis along a guide surface of the rolling guide mechanism;
    repeatedly acquiring a plurality of feed speeds and a plurality of loads applied to the moving body at the acquired feed speeds in a non-machining state under a plurality of different feed speed conditions during a predetermined period; and
    detecting the abnormality based on an approximate function calculated from relationships between the plurality of feed speeds and the plurality of loads acquired under the plurality of different feed speed conditions during the predetermined period.

* * * * *